No. 717,601. PATENTED JAN. 6, 1903.
J. M. NORMAND.
TOOL HOLDER AND CUTTER.
APPLICATION FILED JAN. 13, 1902.
NO MODEL.
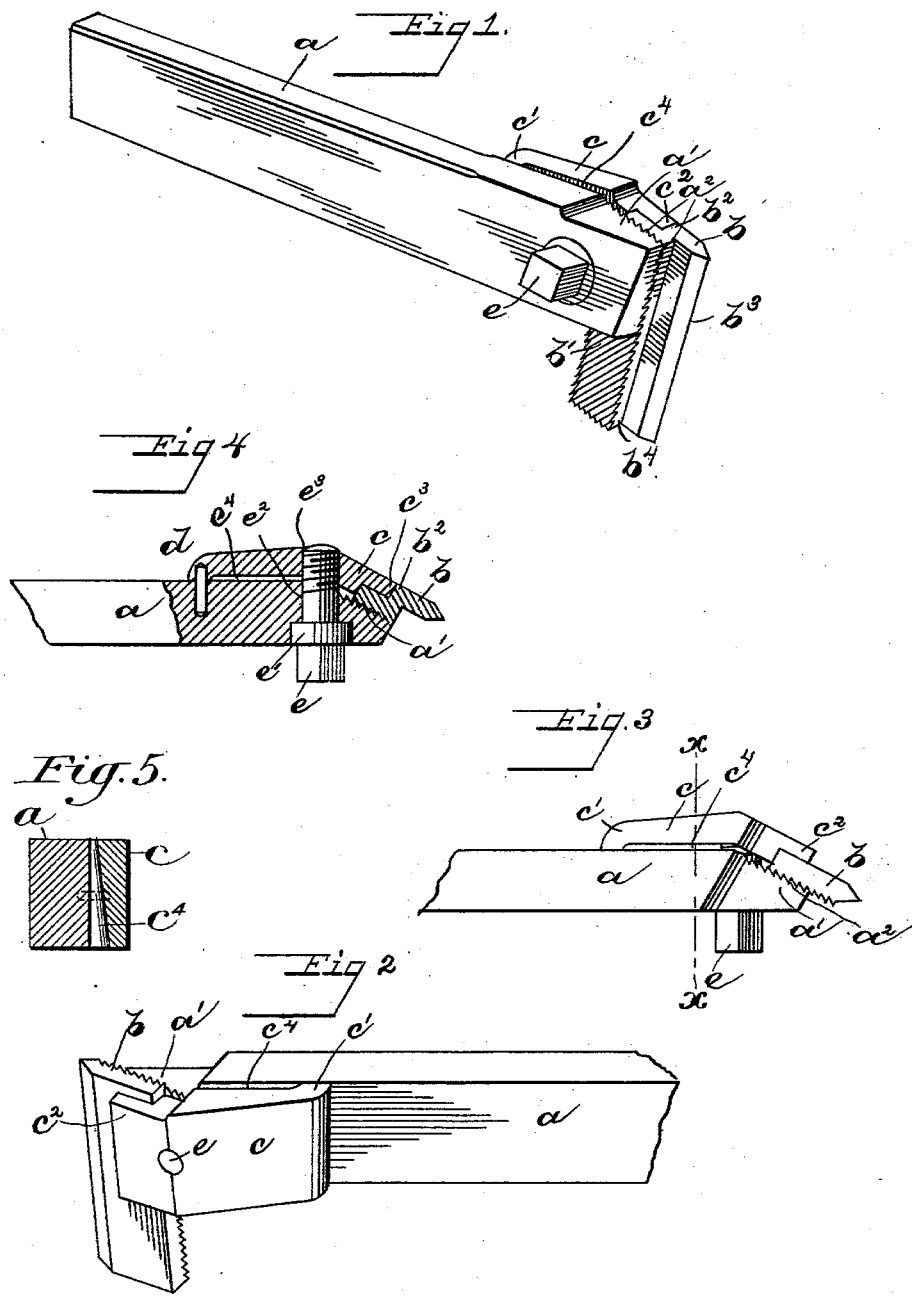

UNITED STATES PATENT OFFICE.

JOSEPH M. NORMAND, OF SPRINGFIELD, OHIO, ASSIGNOR TO THE UNITED STATES TOOL HOLDER COMPANY, OF SPRINGFIELD, OHIO, A CORPORATION OF OHIO.

TOOL-HOLDER AND CUTTER.

SPECIFICATION forming part of Letters Patent No. 717,601, dated January 6, 1903.

Application filed January 13, 1902. Serial No. 89,618. (No model.)

*To all whom it may concern:*

Be it known that I, JOSEPH M. NORMAND, a citizen of the United States, residing at Springfield, in the county of Clark and State of Ohio, have invented certain new and useful Improvements in Tool-Holders and Cutters, of which the following is a specification.

My invention relates to tool-holders and cutters for lathes, planers, and other machines.

The object of my invention is to provide a holder and cutter simple in construction that can be easily adjusted and rigidly held in its adjusted position, and it is especially adapted for screw-thread cutting.

My device is a great saving over the ordinary form of cutter, as the shank or body of my device can be made of less expensive material, and when the cutting edge is worn down the cutter does not have to be reforged, but simply reground. Furthermore, the cutter may be milled to exact standard, and thereby made more proficient.

I attain these objects by the constructions and combinations hereinafter more fully described, and set forth in the accompanying drawings, in which—

Figures 1 and 2 are perspective views of my device. Fig. 3 is a side elevation; Fig. 4, a cross-section, and Fig. 5 is a cross-section on the line $x$ $x$ of Fig. 3.

Like parts are represented by similar letters of reference in the several views.

In the drawings, $a$ represents the shank or body of the holder, having the beveled end $a'$, the angular ratchet-serrations $a^2$ being formed on the bevel to receive the serrated face $b'$ of the cutter $b$, which is held in place by the clamping-plate $c$. The bolt $e$, with its enlarged countersunk portion $e'$, passes through the plain perforation $e^2$ of the beveled end of the body and engages the screw-threaded perforation $e^3$ of the clamping-plate. The cutter is preferably formed with the shoulder $b^2$ to engage the corresponding shoulder $c^3$ of the clamping-plate, as shown in Figs. 1 and 4. This brings the back of the cutter flush with the face of the clamping-plate and enables the operator to cut a thread close to a shoulder, and to maintain the thickness of the cutter with its V-shaped edge $b^3$ for thread-cutting this necessitates the shoulder $b^4$; but a straight cutter without the shoulders $b^2$ and $b^4$ may be employed, as shown in Figs. 2 and 3. A dowel-pin $d$ is fixed in the body $a$ and engages the plate $c$ to keep said plate from lateral movement.

It will be seen that the clamping-plate $c$ rests at its projecting end $c'$ on the body $a$ and at its other end, $c^2$, on the cutter $b$, which lies between it and the beveled end of the body, the serrations $a^2$ of the beveled end of the body fitting in the serrated face $b'$ of the cutter, and by tightening the bolt $e$ the cutter is held rigidly in place. The serrations of the cutter and bevel edge of the body extend with and diagonally from the line of thrust of said cutter toward the body, so that when the tool is at work the greater the thrust the tighter the cutter is held in position. Furthermore, assuming the cutter to be in a vertical position and the body at right angles thereto, the serrations of the cutter are made at a less inclination from the vertical than the serrations of the body, so that when in place on the body the cutter will be given an inclination from the vertical for clearance. The space $c^4$ between the clamping-plate and the body is of greater width at the bottom than the top, as shown in Fig. 5, so that turnings that fall in this space will not clog, but drop through. It will be further seen that the construction is such that the cutter may be of considerable length, is sharpened by grinding at one end, and when ground off from time to time is always capable of being adjusted to the holder by the serrations in its entire length fitting the serrations of the shank or body.

It is obvious that the body and clamp may be formed straight; but I preferably employ the beveled end and incline the clamping-plate to correspond, for in this way the thrust is carried by the serrations against the end of the shank or body.

In making a set-off in tools it is a common practice to bend the end, which throws the cutting edge to one side of the axis; but in my construction by using the beveled end the cutter is kept in line with the axis, making it more rigid.

Having thus described my invention, I claim—

1. The combination with the shank or body having ratchet-serrations thereon extending from its cutter-carrying end diagonally toward the base-line of said body, of a cutter having ratchet-serrations thereon adapted to engage the serrations of said body, the serrations of said cutter being at a greater inclination from its base-line than the serrations of the body are to the base-line of said body, and means to clamp said cutter to said body, substantially as specified.

2. The combination with the shank or body having a beveled end with ratchet-serrations extending from its outer edge across the face of said bevel at an inclination toward the base-line of said body, of a cutter having serrations thereon adapted to engage the serrations of said body, the serrations of said cutter being at a greater inclination from its base-line than the body-serrations are to the base-line of said body, and means for clamping the cutter to said body, substantially as specified.

In testimony whereof I have hereunto set my hand this 28th day of December, A. D. 1901.

JOSEPH M. NORMAND.

Witnesses:
PERCY NORTON,
CHAS. I. WELCH.